United States Patent Office 3,322,785
Patented May 30, 1967

3,322,785
SUBSTITUTED ISOINDOLENINE DERIVATIVES
Henry Fletcher, Moston, Manchester, England, assignor to The Aliphatic Research Company Limited, Simonsway, England
No Drawing. Filed Nov. 16, 1964, Ser. No. 411,597
Claims priority, application Great Britain, Nov. 19, 1963, 45,548/63, 45,549/63, 45,550/63
18 Claims. (Cl. 260—326.1)

The present invention relates to the production of heterocyclic organic compounds and in particular to substituted isoindolenines and their production.

According to the present invention there is embodied a novel group of substituted isoindolenines having the formula:

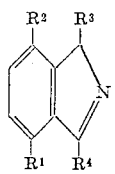

(I)

and salts thereof with acids, wherein the groups $R^1$, $R^2$, $R^3$ and $R^4$ are the same or different and each is a lower alkyl group (alkyl with 1 to 6 carbon atoms) or an aryl group (phenyl or lower alkyl-substituted phenyl).

The salts of the substituted isoindolenines may be salts of sulphuric acid, phosphoric acid, hydrochloric or other hydrohalic acid, nitric acid, thiocyanic acid or other inorganic acid, or of acetic or other monocarboxylic acid, picric acid, p-toluene sulphonic acid or other organic acid. These salts can generally be directly produced by proceeding according to the present invention, although in some cases they are more easily produced from the corresponding free base (produced according to the invention, or obtained from another salt produced by this invention) and the corresponding acid, to produce the desired salt.

In one aspect thereof, the present invention provides a process of producing a substituted isoindolenine I or a salt thereof with an inorganic or organic acid, as hereinbefore defined, which comprises reacting a gamma-diketone having the formula:

(II)

with a 2,5-disubstituted pyrrole having the formula:

(III)

wherein the groups $R^1$, $R^2$, $R^3$ and $R^4$ have the previously-defined significances, the reaction being carried out substantially in the absence of molecular oxygen.

If one or more of the groups $R^1$, $R^2$, $R^3$ and $R^4$ is an alkyl group, the alkyl group is, as aforestated, one having from one to six carbon atoms, for example methyl, ethyl, n-propyl, isopropyl, n-butyl, isobutyl, t-butyl, n-amyl or n-hexyl. If one or more of the groups is aryl, it may be for example an unsubstituted or lower alkyl-substituted phenyl group.

The gamma-diketone II which is reacted with the 2,5-disubstituted pyrrole is a compound in which both of the groups $R^1$ and $R^2$ are the same or different alkyl groups, each containing from one to three carbon atoms, for example acetonylacetone, heptane-2,5-dione, octane-2,5-dione, octane-3,6-dione, nonane-3,6-dione or 2-methylheptane-3,6-dione. Other gamma-diketones which can be used include compounds in which one of the groups $R^1$ and $R^2$ is lower alkyl, the other group being aryl, for example 1-p-tolylpentane-1,4-dione; and compounds in which both groups $R^1$ and $R^2$ are the same or different aryl, for example dibenzoylethane.

The 2,5-disubstituted pyrrole III can be a compound in which $R^3$ and $R^4$ are both alkyl groups each containing from one to three carbon atoms, for example 2,5-dimethyl pyrrole, 2,5-diethylpyrrole, 2,5-di-n-propylpyrrole, 2,5-di-isopropylpyrrole, 2-methyl-5-ethylpyrrole, 2-methyl-5-n-propylpyrrole and 2-ethyl-5-isopropylpyrrole. Other pyrroles III which can be used include 2,5-disubstituted pyrroles in which one of the groups $R^3$ and $R^4$ is lower alkyl, the other being aralkyl or aryl, for example 2-methyl-5-p-methylphenylpyrrole, 2-ethyl-5-p-methylphenylpyrrole, 2-isopropyl-5-p-methylphenylpyrrole, 2-methyl-5-p-ethylphenylpyrrole, 2-methyl-5-p-isopropylphenylpyrrole, 5-methyl-2-phenylpyrrole, 5-ethyl-2-phenylpyrrole, 5-isopropyl-2-phenylpyrrole and 5-methyl-2-tolylpyrrole. Still other pyrroles III which can be used include compounds in which $R^3$ and $R^4$ are both phenyl, the same or different alkyl-substituted phenyl or other aryl groups, for example, 2,5-diphenylpyrrole, 2-phenyl-5-tolylpyrrole and 2,5-ditolylpyrrole.

The reaction of the gamma-diketone II and the 2,5-disubstituted pyrrole III in accordance with this aspect of the invention is preferably carried out in the presence of a non-oxidizing mineral acid or of an organic acid stronger than acetic acid, for example concentrated hydrochloric acid, or p-toluene sulphonic acid. Other reagents such as phosphorus oxychloride can also advantageously be used.

The reaction is preferably carried out in an organic solvent in which the gamma-diketone II and the pyrrole III are at least partially soluble under the conditions of the reaction. Examples of suitable solvents include toluene, hexane, diethyl ether, methanol and ethanol. If the gamma-diketone II used is acetonylacetone, the reaction can be carried out in the presence of water. With other gamma-diketone reactants II, however, it is preferred to remove water produced during the reaction, for instance by removing the water as it is formed as an azeotrope with a solvent immiscible with water.

The reaction may be carried out substantially in the absence of molecular oxygen by operating in an atmosphere of nitrogen or other inert gas. When carried out on a small scale, the process according to this aspect of the invention may be conveniently conducted in a gloved box in which the air present has been replaced by nitrogen or other inert gas. On a larger scale, the apparatus in which the process is carried out can be freed from air by flushing out with the inert gas and maintaining an atmosphere of inert gas during the production and recovery of the desired product, conveniently at a slightly superatmospheric pressure to obviate leakage of atmospheric oxygen into the apparatus.

The product of the reaction may comprise a salt of the desired substituted isoindolenine with an acid; this may occur, for example, when hydrochloric acid or p-toluene sulphonic acid is used in the reaction. The free isoindolenine base can be obtained from this product by treatment with alkali in an amount at least sufficient to neutralize both any free acid present in the reaction product and the acid combined in the salt; for example, an aqueous solution of an alkali metal hydroxide, carbonate or bicarbonate may be added to the reaction product. The alkali used is a stronger base than the isoindolenine base to be liberated from the salt. The product is then, if desired, washed and dried, or further purified, and isolated, by per se conventional methods. Alternatively, a salt or other derivative of the substituted isoindolenine can be prepared or recovered from the latter, and isolated, by per se conventional methods. The product of the reaction may also comprise a crystalline complex of the substituted isoindolenine with a solvent used in the process, for example diethyl ether.

The product thus obtained can be washed and dried, or further purified, and isolated by per se conventional methods, taking care to exclude contacting free substituted isoindolenine base with molecular oxygen. Alternatively to the isolation of the free substituted isoindolenine, the free base comprised in the product of the reaction can be converted to a desired salt of another inorganic or organic acid, by per se conventional procedures, taking care to exclude molecular oxygen at least until the dry salt is obtained.

The substituted isoindolenines of the present invention have valuable activity as oxygen-scavenging agents, that is to say they have the property of removing molecular oxygen from an atmosphere in which they are in contact. In removing oxygen from their environment they themselves become oxidized. The salts of the substituted isoindolenines can readily be converted into other active oxygen-scavenging agents as required by dissolving or dispersing the salt in an aqueous solution of stronger base, for instance by dissolving or dispersing in aqueous alkali metal hydroxide, carbonate or bicarbonate solution. The present invention therefore provides an oxygen-scavenging composition comprising a substituted isoindolenine, or salt thereof, and in particular a composition comprising a salt of a substituted isoindolenine and an alkali such as to provide an oxygen-scavenging composition when dissolved or dispersed in water or other medium; preferably the alkali is or comprises an alkali metal hydroxide, carbonate or bicarbonate, such as sodium hydroxide, sodium carbonate or sodium bicarbonate.

The obtained substituted isoindolenines and their salts with inorganic or organic acids, as well as being valuable oxygen-scavenging agents, may also find application as antimicrobial, insecticidal or parasiticidal agents, or as intermediates in the manufacture of other organic compounds, for example they may be reduced by conventional methods to the corresponding isoindolines.

The following examples further illustrate the first aspect of the present invention. Parts by weight shown therein bear the same relation to parts by volume as do kilograms to liters. Percentages are expressed by weight unless otherwise stated.

Example 1

A mixture of 5.6 parts by weight of acetonylacetone, 4.8 parts by weight of 2,5-dimethylpyrrole, 9.6 parts by weight of p-toluene sulphonic acid and 100 parts by volume of toluene was boiled under reflux for 18 hours under an atmosphere of nitrogen, the water produced in the reaction being continuously removed. The reaction mixture was then extracted with water and the resulting aqueous layer was made alkaline with aqueous sodium hydroxide solution.

The 1,3,4,7-tetramethylisoindolenine which precipitated was recrystallized from diisopropyl ether to yield 2.2 parts by weight of the product as yellow, needle-shaped crystals having melting point 143° to 144° C. and the following elementary analysis:

Calculated ($C_{13}H_{15}N$): C, 83.22%; H, 8.73%; N, 8.08%. Found: C, 83.33%; H, 8.78%; N, 7.88%.

Example 2

A mixture of 2.85 parts by weight of 3,6-octanedione, 2.46 parts by weight of 2,5-diethylpyrrole, 5.0 parts by weight of p-toluene sulphonic acid and 30 parts by volume of toluene were reacted by the procedure of Example 1.

The reaction mixture was extracted several times with water. The aqueous extract was made alkaline with aqueous sodium hydroxide solution and extracted with ether. The ether was removed by distillation and the residual oil was dissolved in ethanol. Alcoholic picric acid was added to the ethanolic solution and the crystalline picrate derivative, which was deposited slowly over a period of 2 hours, was collected by filtration.

On adding petroleum ether (boiling point range 40° to 60° C.) to a solution of the picrate in a minimum amount of chloroform, the product 1,3,4,7-tetraethylisoindolenine picrate separated as a yellow amorphous solid having melting point 122° C. and the following elementary analysis.

Calculated ($C_{22}H_{26}N_4O_7$): C, 57.62%; H, 5.72%; N, 12.22%. Found: C, 57.71%; H, 5.94%; N, 12.25%.

Example 3

A mixture of 1.2 parts by weight of acetonylacetone, 0.61 part by weight of 2,5-diethylpyrrole, 2.0 parts by weight of p-toluene sulphonic acid and 30 parts by volume of toluene was reacted, and the picrate derivative was produced, by the procedure described in Example 2.

The product was 1,3-diethyl-4,7-dimethylisoindolenine, which was then converted into 1,3-diethyl-4,7-dimethylisoindolenine picrate in the form of yellow, needle-shaped crystals, having melting point 144° C. and the following elementary analysis.

Calculated ($C_{20}H_{22}N_4O_7$): C, 55.81%; H, 5.15%; N, 13.02%. Found: C, 56.19%; H, 5.25%; N, 12.99%.

Example 4

A solution of 11.5 parts by weight of acetonylacetone, 8.0 parts by weight of 5-methyl-2-phenylpyrrole and 10 parts by weight of p-toluene sulphonic acid in 230 parts by weight of toluene was refluxed for 2 hours in an atmosphere of nitrogen using a Dean and Stark apparatus to remove water.

On cooling the solution, 16 parts by weight of the product 1-phenyl-3,4,7-trimethylisoindolenine p-toluene sulphonate was deposited and was crystallized from a mixture of ethanol and toluene as needle-shaped crystals having melting point 198° C. and the following elementary analysis.

Calculated ($C_{24}H_{25}NSO_3$): C, 70.21%; H, 5.89%; N, 3.56%; S, 8.15%. Found: C, 70.55%; H, 6.31%; N, 3.52%; S, 7.90%. Treatment of this sulphonate with alkali metal hydroxide yields the free 1-phenyl-3,4,7-trimethylisoindolenine.

Example 5

A solution of 4.6 parts by weight of acetonylacetone, 3.44 parts by weight of 2-methyl-5-p-methylphenylpyrrole and 4.0 parts by weight of p-toluene sulphonic acid in 50 parts by volume of toluene was refluxed for 12 hours and the product recovered, by the procedure of Example 4.

2.3 parts by weight of the product 1-p-methylphenyl-3,4,7-trimethylisoindolenine p-toluene sulphonate were obtained, which was crystallized from a mixture of ethanol and toluene as 2.3 parts by weight of needle-shaped crystals having melting point 166° C. and the following elementary analysis.

Calculated ($C_{25}H_{27}NSO_3$): C, 71.22%; H, 6.45%; N, 3.32%; S, 7.60%. Found: C, 71.16%; H, 6.56%; N, 3.16%; S, 7.44%. Treatment of this sulphonate with alkali metal hydroxide yields 1-p-methylpheny-3,4,7-trimethylisoindolenine.

Example 6

A mixture of 2.1 parts by weight of acetonylacetone, 4 parts by weight of 2,5-diphenylpyrrole, 120 parts by volume of concentrated hydrochloric acid and 200 parts by volume of 95% aqueous ethanol was refluxed for 18 hours in an atmosphere of nitrogen.

On adding aqueous sodium hydroxide solution a precipitate formed, which was collected and dried. The crude product was crystallized from ethanol to yield needle-shaped crystals of 1,3-diphenyl-4,7-dimethylisoindolenine having melting point 193° C. and the following elementary analysis.

Calculated ($C_{22}H_{19}N$): C, 88.82%; H, 6.43%; N, 4.71%. Found: C, 88.73%; H, 6.69%; N, 4.46%.

Example 7

The procedure described in Example 6 was carried out using a mixture of 2.38 parts by weight of dibenzoylethane, 2.14 parts by weight of 2,5-diphenylpyrrole, 60 parts by volume of concentrated hydrochloric acid and 150 parts by volume of ethanol.

The product was 0.8 part by weight of needle-shaped crystals of 1,3,4,7-tetraphenylisoindolenine having melting point of 262° C. and the following elementary analysis.

Calculated ($C_{32}H_{23}N$): C, 91.18%; H, 5.49%; N, 3.32%. Found: C, 91.13%; H, 5.53%; N, 3.32%.

Example 8

A mixture of 2.8 parts by weight of 1-p-tolylpentane-1,4-dione, 4.4 parts by weight of 2,5-diphenylpyrrole, 12 parts by weight of trichloroacetic acid and 75 parts by volume of hexane was boiled under reflux for 18 hours in an atmosphere of nitrogen using a Dean and Stark apparatus to remove the water produced.

The hexane was removed by distillation and the residue was dissolved in ether. The ethereal solution was washed first with aqueous sodium hydroxide solution and then with water until the washings were neutral to litmus. The ether was then removed by distillation and the residual brown oil was extracted with petroleum ether (boiling point range 40° to 60° C.)

The 1,3 - diphenyl - 4 - methyl-7-p-tolylisoindolenine which was deposited when the ethereal solution was concentrated, was crystallized from diisopropyl ether to give 1.3 parts by weight as micro crystals having melting point 165° and the following elementary analysis.

Calculated ($C_{28}N_{23}N$): C, 90.03%; H, 6.20%; N, 3.76. Found: C, 87.98%; H, 6.07%; N, 3.47%.

Example 9

A solution of 2.5 parts by weight of phosphorus oxychloride in sodium-dried ether was added slowly with stirring to a cooled solution of 3.45 parts by weight of hexane-2,5 - dione and 2.85 parts by weight of 2,5-dimethylpyrrole in 40 parts by volume of sodium-dried ether. The addition was made in an atmosphere of nitrogen.

The reaction mixture was left for one hour during which time the product separated as a red oil. 30 parts by volume of water were added to dissolve this product and the aqueous extract was neutralized with aqueous sodium hydroxide solution.

The 1,3,4,7-tetramethylisoindolenine which precipitated was crystallized from diisopropyl ether to give reddish brown needle-shaped crystals having melting point 143° C.

Example 10

5 parts by volume of concentrated hydrochloric acid were added dropwise to a stirred mixture of 2.35 parts by weight of acetonylacetone and 1.9 parts by weight of 2,5-dimethylpyrrole. The addition was made in an atmosphere of nitrogen. After 30 minutes, 8 parts by volume of water were added and the resulting solution was made alkaline with 20% aqueous sodium hydroxide solution.

The solid which precipitated was crystallized from diisopropyl ether to give 1.2 parts by weight of 1,3,4,7-tetramethylisoindolenine as needle-shaped crystals having melting point 143° C.

Example 11

A mixture of 2.3 parts by weight of acetonylacetone, 2 parts by weight of 2,5-dimethylpyrrole, 380 parts by volume of water and 20 parts by volume of 2 N-sulphuric acid was refluxed for 18 hours in an atmosphere of nitrogen.

The solid which precipitated was crystallized from diisopropyl ether to give 1.95 parts by weight of 1,3,4,7-tetramethylisoindolenine as needle-shaped crystals having melting point 144° C. to 146° C. The yield was 46.8% theoretical.

Example 12

A mixture of 4.2 parts by weight of acetonylacetone, 8 parts by weight of 2,5-diphenylpyrrole, 13 parts by weight of p-toluene sulphonic acid and 150 parts by volume of toluene was boiled under reflux for 18 hours in an atmosphere of nitrogen, using a Dean and Stark apparatus to remove water produced.

The toluene was removed by distillation and the residue was dissolved in ether. The ethereal solution was washed with aqueous sodium hydroxide solution and then with water until the water washings were neutral to litmus. The residue which remained after removing the ether was crystallized from ethanol to yield 3.5 parts by weight of 4,7 - dimethyl-1,3 - diphenylisoindolenine as needle-shaped crystals having melting point 193° C. and having the following elementary analysis.

Calculated ($C_{22}H_{19}N$): C, 88.82%; H, 6.43%; N, 4.71%. Found: C, 88.73%; H, 6.69%; N, 4.46%.

Example 13

A mixture of 4.8 parts by weight of 2.5-diphenylpyrrole, 5.25 parts by weight of dibenzoylethane, 62.8 parts by weight of trichloroacetic acid and 400 parts by volume of hexane was boiled under reflux for 18 hours under an atmosphere of nitrogen using a Dean and Stark apparatus to remove water formed.

The hexane was removed by distillation and the residual tar triturated with ethanol. The solid which separated was crystallized from ethanol to give 3.6 parts by weight of 1,3,4,7-tetraphenylisoindolenine as yellow, needle-shaped crystals having melting point 262° C.

Example 14

A mixture of 4.8 parts by weight of dibenzoylethane, 3.2 parts by weight of 2-methyl-5-phenylpyrrole, 12 parts by weight of trichloroacetic acid and 100 parts by volume of hexane was boiled under reflux overnight using a Dean and Stark apparatus to remove the water produced. The hexane was then removed by distillation and the residue was dissolved in ether. The ethereal solution was washed with aqueous sodium hydroxide and then with water until the washings were neutral.

When the ethereal solution was concentrated, the product was 4.2 parts by weight of 1-methyl-3,4,7-triphenyl-isoindolenine ether complex, deposited as green needle-shaped crystals having melting point 173° C. and the following elementary analysis.

Calculated: C, 85.88%; H, 7.20%; N, 3.23%. Found: C, 85.60%; H, 6.79%; N, 3.28%. Removal of ether from this ether complex by conventional methods, yields 1-methyl-3,4,7-triphenylisoindolenine.

According to a second aspect of this invention, the compounds of Formula Ia.

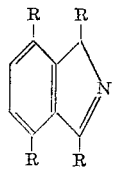

(Ia)

are obtained by reacting a 2,5-dialkyl-substituted pyrrole having the formula:

(IIa)

wherein the groups R are the same or different and each is a lower alkyl group containing from one to six carbon atoms, with an aqueous, non-oxidizing mineral acid, the reaction being carried out substantially in the absence of molecular oxygen.

Any or all of the alkyl groups R in Formulae Ia and IIa may be, for example, methyl, ethyl, n-propyl, isopropyl, n-butyl, isobutyl, t-butyl, n-amyl or n-hexyl groups. The 2,5-dialkyl-substituted pyrrole may be, for example, 2,5-dimethylpyrrole or 2,5-diethylpyrrole.

The process according to this second aspect of the invention is carried out using an aqueous, non-oxidizing mineral acid, so that it is effected without bringing about any substantial oxidation of the 2,5-dialkyl-substituted pyrrole. The acid may be, for example, an aqueous solution of sulphuric acid, phosphoric acid or hydrochloric acid. The reaction of the acid reactant with the pyrrole IIa may, in general, be carried out by heating the reactants together under reflux conditions.

As in the first process aspect of the invention, the reaction may be carried out substantially in the absence of molecular oxygen by operating in an atmosphere of nitrogen or other inert gas. When carried out on the small scale, the second aspect process may also be conveniently conducted in a gloved box in which the air present has been replaced by nitrogen or other inert gas. On a larger scale, the apparatus in which the second aspect process is carried out can be freed from air by flushing out with the inert gas and maintaining an atmosphere of inert gas during the production and recovery of the desired product, conveniently at a slightly superatmospheric pressure to obviate leakage of atmospheric oxygen into the apparatus.

The product of the reaction will, in general, comprise a salt of the desired substituted isoindolenine with the acid used as reactant. The free isoindolenine itself may, as before, be liberated from this product by treatment with alkali in an amount at least sufficient to neutralize any free acid present in the reaction product and the acid combined in the salt; for example, an aqueous solution of an alkali metal hydroxide, carbonate or bicarbonate may be added to the reaction product. The alkali used is a stronger base than the organic base to be liberated from the salt.

The obtained product may be washed and dried, or further purified, and isolated by per se conventional methods, taking care to exclude contacting free substituted isoindolenine base with molecular oxygen. Alternatively to the isolation of the free substituted isoindolenine base, the free base comprised in the product of the reaction may be converted to a desired salt of another inorganic or organic acid, by per se conventional procedures, taking care to exclude molecular oxygen at base until the dry salt is obtained.

The following examples further illustrate the second aspect of the present invention. Parts by weight shown therein bear the same relation to parts by volume as do kilograms to liters. Percentages are expressed by weight unless otherwise stated.

*Example 15*

A mixture of 2 parts by weight of 2,5-dimethylpyrrole, 380 parts by volume of water and 20 parts by volume of 2 N-sulphuric acid was refluxed for 18 hours in an atmosphere of nitrogen.

The resulting product was made alkaline by adding aqueous sodium hydroxide solution. The solid which was thus precipitated was crystallized from diisopropyl ether to yield 1.0 part by weight of 1,3,4,7-tetramethylisoindolenine as needle-shaped crystals having melting point 143° to 144° C. The yield obtained was 55.3% theoretical.

*Example 16*

By carrying out the procedure described in Example 15 using, instead of aqueous sulphuric acid as acid reactant, equivalent proportions of aqueous phosphoric acid and aqueous hydrochloric acid, the product 1,3,4,7-tetramethylisoindolenine is produced identical to that produced in Example 15.

According to a third aspect of the invention, 1,3,4,7-tetramethylisoindolenine, and salts thereof with acids are produced by reacting acetonylacetone with an ammonium salt, the pH of a molar solution of which is less than 7.0, the reaction being carried out substantially in the absence of molecular oxygen.

The salt of the 1,3,4,7-tetramethylisoindolenine may for example be a salt of sulphuric acid, phosphoric acid, hydrochloric or other hydrohalic acid, nitric acid, thiocyanic acid, inorganic acid, or of acetic or other monocarboxylic acid, picric acid, or other organic acid. These salts are generally directly produced by the process of this aspect of the present invention, but they can also be produced from the corresponding free base and the corresponding acid to produce the desired salt.

The ammonium salt with which the gamma-diketone is reacted is a salt, the pH of a molar solution of which is less than 7.0 and preferably less than 5.5. Ammonium sulphate, ammonium chloride, ammonium thiocyanate and ammonium nitrate are examples of such salts, the pH of a molar solution of which is less than 7.0. If ammonium phosphate or ammonium acetate is reacted with the acetonylacetone, the desired 1,3,4,7-tetramethylisoindolenine of the invention is not produced in significant yields.

In this third aspect process of the invention, the ammonium salt is conveniently in the form of an aqueous solution. The reaction is carried out by heating acetonylacetone with an aqueous solution of the ammonium salt, for example by boiling acetonylacetone and the solution of the ammonium salt together under reflux conditions. Preferably the reaction is carried out with an excess of the ammonium salt over the stoichiometric proportion of acetonylacetone.

The reaction may be carried out substantially in the absence of molecular oxygen by operating in an atomosphere of nitrogen or other inert gas. As before, when carried out on a small scale, the process also of this aspect may be conveniently conducted in a gloved box in which the air present has been replaced by nitrogen or other inert gas. On a larger scale, the apparatus in which the process is carried out can be freed from air by flushing out with the inert gas and maintaining an atmosphere of inert gas during the production and recovery of the desired product, conveniently at a slightly superatmospheric pressure to obviate leakage of atmospheric oxygen into the apparatus.

The product of the third aspect reaction may also comprise a salt of 1,3,4,7-tetramethylisoindolenine with an acid and, if the free base or a salt of the base with another acid is desired, the free 1,3,4,7-tetramethylisoindolenine is obtained from the product by treating the product with alkali, for example by addition of an aqueous solution of an alkali metal hydroxide, carbonate or bicarbonate. The alkali used is a stronger base than the organic base to be liberated from the salt.

The product of this third aspect process of the invention may be washed and dried, or further purified, and isolated by per se conventional methods, taking care to exclude contacting free substituted isoindolenine base with molecular oxygen. Alternatively to the isolation of the free 1,3,4,7-tetramethylisoindolenine base, the free base comprised in the product of the reaction may be converted to a desired salt of another inorganic or organic acid, by per se conventional procedures, taking care to exclude molecular oxygen.

The following examples further illustrate the third aspect of the present invention. Parts by weight shown therein bear the same relationship to parts by volume as do kilograms to liters. Percentages are expressed by weight unless otherwise stated.

*Example 17*

45.2 parts by weight of acetonylacetone, 89.8 parts by weight of ammonium sulphate and 800 parts by volume of water were refluxed for 18 hours in an atmosphere of nitrogen. The resulting solution contained 1,3,4,7-tetramethylisoindolenine sulphate, which could be recovered and isolated if desired.

150 parts by volume of a 20% aqueous solution of sodium hydroxide were then added, also under a nitrogen atmosphere. The resulting precipitate was collected by filtration, washed with distilled water until free from alkali, and then dried.

The 1,3,4,7-tetramethylisoindolenine thus produced amounted to 27.9 parts by weight, representing a yield of 81.4% theoretical. The compound was crystallized from 160 parts by volume of diisopropyl ether to give 12.7 parts by weight of yellow, needle-shaped crystals, having melting point 144° to 146° C. A further crop of 10.0 parts by weight of 1,3,4,7-tetramethylisoindolenine having melting point of 144° to 146° C., was recovered from the mother liquor, the total 22.7 parts by weight of the purified compound representing a yield of 66.2% theoretical.

Example 18

11.2 parts by weight of acetonylacetone, 9 parts by weight of ammonium chloride and 200 parts by volume of water were refluxed for 18 hours in an atmosphere of nitrogen. The resulting solution contained 1,3,4,7-tetramethylisoindolenine chloride, which could be recovered and isolated if desired.

The addition of aqueous sodium hydroxide solution to this solution resulted in precipitating free 1,3,4,7-tetramethylisoindolenine, which was collected by filtration, washed with water until the washings were free from alkali and then dried.

The product was crystallized from diisopropyl ether to give 1,3,4,7-tetramethylisoindolenine having melting point 143° to 144° C.

Example 19

The procedure described in Example 18 was carried out using 13.6 parts by weight of ammonium nitrate instead of the ammonium chloride. The resulting solution contained 1,3,4,7-tetramethylisoindolenine nitrate, which could be recovered and isolated if desired.

The product, on crystallization from diisopropyl ether, was 1,3,4,7-tetramethylisoindolenine having melting point 143° to 144° C.

Example 20

The procedure described in Example 19 was carried out using 13 parts by weight of ammonium thiocyanate instead of the ammonium chloride. The resulting solution contained 1,3,4,7-tetramethylisoindolenine thiocyanate, which could be recovered and isolated if desired.

The product, on crystallization from diisopropyl ether, was 1,3,4,7-tetramethylisoindolenine having melting point 143° to 144° C.

The oxygen-scavenging properties of the substituted isoindolenines of the present invention, produced according to any of the aspects thereof, are illustrated, for instance, by the following examples carried out with 1,3,4,7-tetramethylisoindolenine and its salts.

Example A

The test solution was produced by heating together, under reflux conditions, 22.6 parts by weight of acetonylacetone and 49.9 parts by weight of ammonium sulphate in 400 parts by volume of water. The solution produced consisted essentially of 1,3,4,7-tetramethylisoindolenine sulphate.

Samples, each of 250 milliliters, of neutral water initially containing 1.6 parts per million of oxygen were mixed with the quantities of the 1,3,4,7-tetramethylisoindolenine sulphate solution specified in Table I under Winkler test conditions. The results of the tests are also given in the table.

TABLE I

| Quantity of sol. added (ml.): | Oxygen content of treated sol. (p.p.m.) |
|---|---|
| 1 | 0.52 |
| 5 | Nil |
| 10 | Nil |
| 25 | Nil |

A nil result in the second column signifies an immeasurably low proportion of oxygen present in the water. The results demonstrate the effectiveness of 1,3,4,7-tetramethylisoindolenine sulphate as an oxygen-scavenging agent.

Example B

The procedure described in Example A was carried out using samples, each of 280 milliliters of neutral water initially containing 2.6 parts per million of oxygen. The samples were left for 3 days at 21° C. in admixture with the specified amounts of the 1,3,4,7-tetramethylisoindolenine sulphate solution under Winkler test conditions:

The results of the tests are given in Table II, in which a nil result in the second column signifies an immeasurably low proportion of oxygen.

TABLE II

| Quantity of sol. added (ml.): | Oxygen content of treated sol. (p.p.m.) |
|---|---|
| 0.5 | 0.55 |
| 1 | Nil |
| 2 | Nil |

The results again demonstrate the effectiveness of 1,3,4,7-tetramethylisoindolenine sulphate as an oxygen scavenging agent.

Example C

A solution of 1,3,4,7-tetramethylisoindolenine sulphate, prepared as described in Example A, was admixed with sodium hydroxide to raise the pH value of the aqueous mixture to the values stated in Table III. The resulting solutions thus consisted essentially of free 1,3,4,7-tetramethylisoindolenine.

Samples, each of 280 milliliters, of water initially containing 7.12 parts per million of oxygen were treated under Winkler test conditions by the procedure described in Example B. The results are given in Table III, in which a nil result in the third column signifies an immeasurably low proportion of oxygen.

TABLE III

| Quantity of solution added (milliliters) | pH value of solution | Oxygen content of treated solution |
|---|---|---|
| 1 | 4.6 | Nil. |
| 0.5 | 12.0 | 0.8.[1] |
| 1 | 12.0 | Nil. |
| 2 | 12.0 | Nil. |

[1] Part per million.

These results demonstrate the effectiveness of 1,3,4,7-tetramethylisoindolenine as an oxygen-scavenging agent.

If, instead of using the specific compounds as described in Examples A to C, other substituted isoindolenines of this invention or their salts are used in the tests, similar results are obtained to demonstrate the oxygen-scavenging properties.

While the compounds I and Ia have been disclosed and are hereinafter claimed in terms of the isoindolenines, it is recognized that by virtue of their structure, they can also exist in tautomeric form, as follows:

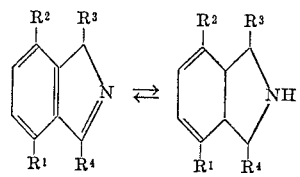

What is claimed is:

1. A member selected from the group consisting of substituted isoindolenines having the formula:

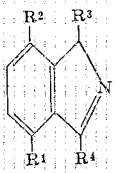

and salts thereof with a member selected from the group consisting of sulphuric acid, phosphoric acid, hydrochloric acid, nitric acid, thiocyanic acid, acetic acid, picric acid and p-toluene sulphonic acid, wherein the groups $R^1$, $R^2$, $R^3$ and $R^4$ are the same or different and each is a member selected from the group consisting of lower alkyl, phenyl and lower alkylphenyl.

2. 1,3,4,7-tetramethylisoindolenine.
3. 1,3,4,7-tetramethylisoindolenine picrate.
4. 1,3,-diethyl-4,7-dimethylisoindolenine.
5. 1,3-diethyl-4,7-dimethylisoindolenine picrate.
6. 1-phenyl-3,4,7-trimethylisoindolenine.
7. 1 - phenyl - 3,4,7 - trimethylisoindolenine-p-toluene sulphonate.
8. 1-p-methylphenyl-3,4,7-trimethylisoindolenine.
9. 1-p-methylphenyl - 3,4,7 - trimethylisoindolenine-p-toluene sulphonate.
10. 1,3-diphenyl-4,7-dimethylisoindolenine.
11. 1,3,4,7-tetraphenylisoindolenine.
12. 1,3-diphenyl-4-methyl-7-p-tolylisoindolenine.
13. 4,7-dimethyl-1,3-diphenylisoindolenine.
14. 1-methyl-3,4,7-triphenylisoindolenine.
15. 1,3,4,7-tetramethylisoindolenine sulphate.
16. 1,3,4,7-tetramethylisoindolenine chloride.
17. 1,3,4,7-tetramethylisoindolenine nitrate.
18. 1,3,4,7-tetramethylisoindolenine thiocyanate.

References Cited

UNITED STATES PATENTS 3,007,939  11/1961  Morton _____ 260—326.1

OTHER REFERENCES

Veber et al.: Jour. Amer. Chem. Soc., vol. 85, March 1963, pp. 645–646.

ALEX MAZEL, *Primary Examiner.*

MARY O'BRIEN, *Assistant Examiner.*